(12) United States Patent
Kuwabara

(10) Patent No.: US 9,033,090 B2
(45) Date of Patent: May 19, 2015

(54) BRAKE HOSE GUIDE

(75) Inventor: Naoki Kuwabara, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 332 days.

(21) Appl. No.: 13/597,972

(22) Filed: Aug. 29, 2012

(65) Prior Publication Data

US 2013/0056593 A1 Mar. 7, 2013

(30) Foreign Application Priority Data

Aug. 29, 2011 (JP) ................................. 2011-185685

(51) Int. Cl.
*B62K 11/00* (2006.01)
*F16L 3/00* (2006.01)
*B60T 17/04* (2006.01)

(52) U.S. Cl.
CPC ................... *B60T 17/046* (2013.01)

(58) Field of Classification Search
USPC ................... 180/219, 227; 248/71, 65
See application file for complete search history.

(56) References Cited

U.S. PATENT DOCUMENTS

| | | | |
|---|---|---|---|
| 3,934,802 A * | 1/1976 | Jennings ......................... | 248/71 |
| 4,733,835 A * | 3/1988 | Schlanger et al. .............. | 248/71 |
| 5,188,319 A * | 2/1993 | Hawash et al. ............... | 248/68.1 |
| 5,673,878 A * | 10/1997 | Yamate et al. ................... | 248/65 |
| 5,730,399 A * | 3/1998 | Baginski ......................... | 248/58 |
| 6,070,837 A * | 6/2000 | Bond ............................... | 248/71 |
| 6,516,909 B2 * | 2/2003 | Gogo ............................. | 180/219 |
| 6,669,150 B2 * | 12/2003 | Benoit et al. ................. | 248/74.2 |
| 7,316,374 B2 * | 1/2008 | Maruyama ................... | 248/68.1 |
| 7,887,012 B2 * | 2/2011 | Desai et al. ..................... | 248/55 |

FOREIGN PATENT DOCUMENTS

JP 2001-354183 A 12/2001

\* cited by examiner

*Primary Examiner* — Joseph Rocca
*Assistant Examiner* — Marc A Scharich
(74) *Attorney, Agent, or Firm* — Birch, Stewart, Kolasch & Birch, LLP

(57) ABSTRACT

A brake hose guide includes a guide portion constructed of a pair of vertical wall portions with a connecting portion for connecting the vertical wall portions to each other. The brake hose guide is fastened to a support body for allowing a brake hose to pass through the inside of the guide portion. A mounting portion is connected to a specified vertical wall portion that constitutes at least one of the pair of vertical wall portions and is formed such that a portion of the mounting portion projects more toward the inside of the guide portion than the specified vertical wall portion. At least a portion of a fastening hole, that is formed in the mounting portion so as to allow a fastening member to pass therethrough, is arranged inside an outer end portion of the specified vertical wall portion as viewed from the fastening direction toward the support body.

20 Claims, 7 Drawing Sheets

BRAKE HOSE GUIDE

CROSS-REFERENCE TO RELATED APPLICATIONS

The present application claims priority under 35 USC 119 to Japanese Patent Application No. 2011-185685 filed Aug. 29, 2011 the entire contents of that are hereby incorporated by reference.

BACKGROUND OF THE INVENTION

1. Field of the Invention

The present invention relates to a brake hose guide that includes a guide portion formed of a pair of vertical wall portions and a connecting portion that is arranged between these vertical wall portions and connects these vertical portions. The brake hose guide is fastened to a support body in a state where a brake hose is allowed to pass through the inside of the guide portion.

2. Description of Background Art

A structure is disclosed in JP-A-2001-354183 wherein a wheel brake is mounted on a rear wheel that is pivotally supported on a rear portion of a swing arm of a motorcycle. A brake hose for supplying a liquid pressure to the wheel brake is arranged along an upper surface of the swing arm. A pair of brake hose guides for holding the brake hose is mounted on the upper surface of the swing arm.

The brake hose guide disclosed in the above-mentioned JP-A-2001-354183 includes, as integral parts thereof, a guide portion that allows the brake hose to pass therethrough and a pair of mounting portions arranged on both sides of the guide portion. When a distance between both mounting portions is narrow, a width of the guide portion also becomes narrow so that, depending on a shape of a swing arm, it is difficult to ensure a space for mounting the brake hose guide in the swing arm.

SUMMARY AND OBJECTS OF THE INVENTION

The present invention has been made in view of the above-mentioned circumstances. It is an object of an embodiment of the present invention to provide a brake hose guide that can be mounted even when a mounting width is relatively narrow.

To achieve the above-mentioned object, an embodiment of the present invention is directed to a brake hose guide comprising a guide portion, the guide portion being constructed of a pair of vertical wall portions with a connecting portion for connecting the vertical wall portions to each other. The brake hose guide is fastened to a support body in such a manner that a brake hose is allowed to pass through the inside of the guide portion. A feature of an embodiment of the present invention is directed to the brake hose guide the includes a mounting portion connected to the specified vertical wall portion that constitutes at least one of the pair of vertical wall portions and is formed such that a portion of the mounting portion projects more toward the inside the guide portion than the specified vertical wall portion. At least a portion of a fastening hole that is formed in the mounting portion so as to allow a fastening member to pass therethrough is arranged more inside than an outer end portion of the specified vertical wall portion as viewed in a fastening direction toward the support body.

According to an embodiment of the present invention, an opening portion for allowing the fastening member to pass therethrough is formed on the guide portion on an extension of a center axis of the fastening hole.

According to an embodiment of the present invention, the center axis of the fastening hole is arranged more inside than the outer end portion of the specified vertical wall portion as viewed from the fastening direction.

According to an embodiment of the present invention, a counterboring portion is coaxially and contiguously formed with the fastening hole for preventing an enlarged diameter head portion of the fastening member, that is allowed to pass through the fastening hole, from projecting toward the inside of the guide portion, formed in the mounting portion in such a manner that the counterboring portion accommodates the enlarged diameter head portion therein.

According to an embodiment of the present invention, the support body is a swing arm that pivotally supports a rear wheel of a motorcycle, and includes, in addition to the mounting portion that is arranged on one side in a vehicle widthwise direction, a second mounting portion that is arranged on the other side in the vehicle widthwise direction with a second fastening hole being formed as an integral part thereof.

The first vertical wall portion 63*aa* of the embodiment corresponds to the specified vertical wall portion of the present invention.

According to an embodiment of the present invention, the brake hose guide further comprises the mounting portion that is connected to the specified vertical wall portion that constitutes at least one of the pair of vertical wall portions and is formed such that the portion of the mounting portion projects more toward an inside of the guide portion than the specified vertical wall portion, and at least the portion of the fastening hole formed in the mounting portion is arranged more inside than the outer end portion of the specified vertical wall portion. Accordingly, even when a mounting space for mounting the brake hose guide on the support body is small, the brake hose guide can be mounted on the support body.

According to an embodiment of the present invention, the opening portion for allowing the fastening member to pass therethrough is formed on the guide portion on the extension of the center axis of the fastening hole. Accordingly, a fastening operation of the fastening member can be performed from the guide portion side in a state where the mounting portion is brought into contact with the support body. Thus, a brake hose guide mounting operation can be easily performed.

According to an embodiment of the present invention, the center axis of the fastening hole is arranged more inside than the outer end portion of the specified vertical wall portion. Accordingly, even when the mounting space for mounting the brake hose guide on the support body is even smaller, the brake hose guide can be mounted.

According to an embodiment of the present invention, the counterboring portion that is coaxially connected with the fastening hole is formed in the mounting portion in such a manner that the enlarged diameter head portion of the fastening member can be accommodated in the counterboring portion. Accordingly, it is possible to make the enlarged diameter head portion minimally injure the brake hose that is allowed to pass through the guide portion.

According to an embodiment of the present invention, the brake hose guide includes the mounting portion arranged on one side in the vehicle widthwise direction, and the second mounting portion arranged on the other side in the vehicle widthwise direction as integral parts thereof, and is mounted on the swing arm of the motorcycle. Accordingly, a support width of the brake hose can be broadened while decreasing a space necessary for mounting the brake hose guide on a swing arm side.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

An embodiment of the present invention is explained in conjunction with FIG. 1 to FIG. 8. In the explanation made hereinafter, the frontward and rearward directions, the upward and downward directions, and the leftward and rightward directions are directions as viewed from a rider who rides on a motorcycle.

Figure 1:
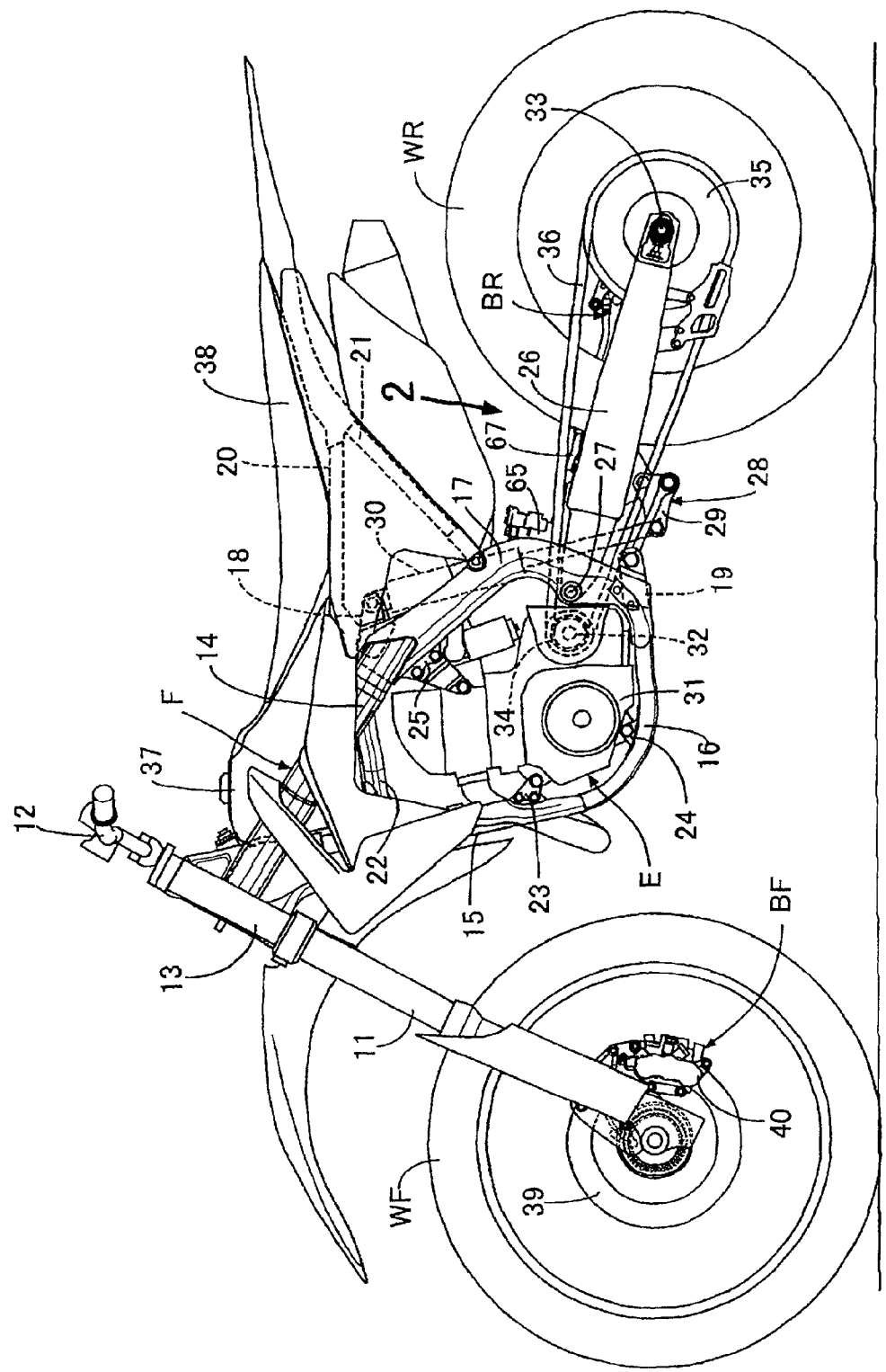
FIG. 1 a left side view of a motorcycle.

As illustrated in FIG. 1, a miniaturized vehicle is a motocross motorcycle. A vehicle body frame F of the motorcycle includes a head pipe 13 for supporting a front fork 11 that pivotally supports a front wheel WF and a bar-shaped steering handle 12 in a steerable manner. A pair of left and right main frames 14 are provided extending in the rearward and downward direction from the head pipe 13. A down frame 15 extends in the rearward and downward direction from the head pipe at a steeper angle than the main frames 14. A pair of left and right lower frames 16 is connected to a lower end portion of the down frame 15 and extend in the rearward direction. A pair of left and right pivot plates 17 include upper end portions thereof joined to rear end portions of the main frames 14 and extend in the downward direction with lower end portions thereof being connected to rear end portions of both lower frames 16. An upper cross member 18 is arranged between the upper end portions of the pivot plates 17 with a lower cross member 19 arranged between the lower end portions of both pivot plates 17. A pair of left and right seat rails 20 include front end portions thereof connected to the upper cross member 18 and extend in the rearward direction. A pair of left and right rear frames 21 connect intermediate portions of both pivot plates 17 in the vertical direction and rear portions of both seat rails 20 to each other. An approximately U-shaped reinforcing frame 22 connects a lower portion of the down frame 15 and both main frames 14 to each other.

An engine E is arranged in a space surrounded by the main frames 14, the down frame 15, the lower frames 16 and the pivot plates 17. A front portion of the engine E is supported on the down frame 15 by way of a first engine hanger 23, a lower portion of the engine E is supported by second engine hangers 24 mounted on the lower frames 16. An upper portion of the engine E is supported on upper portions of the pivot plates 17 by way of third engine hangers 25.

A front end portion of a swing arm 26 pivotally supports a rear wheel WR on a rear end portion thereof and is supported on lower portions of the pivot plates 17 by way of a support shaft 27 in a vertically swingable manner. A link mechanism 28 is arranged between the lower cross member 19 and the swing arm 26 with a shock absorber 30 being arranged between a link member 29 that constitutes a portion of the link mechanism 28 and the upper cross member 13.

A transmission not shown in the drawing is housed in the inside of a crankcase 31 that the engine E includes. An output shaft 32 of the transmission projects leftward from the crankcase 31 with an endless chain 36 extending between and being wound around a drive sprocket 34 that is mounted on the output shaft 32. A driven sprocket 35 is mounted on an axle 33 of the rear wheel WR.

Further, a fuel tank 37 is mounted on both the main frames 14 above the engine E, and a rider's seat 38 is arranged behind the fuel tank 37 in a state where the rider's seat 38 is supported on the seat rails 20.

The rotation of the front wheel WF can be braked by a front-wheel-use disc brake BF that includes a brake disc 39 that is rotated together with the front wheel WF and a caliper 40 supported on the front fork 11 in a state wherein the caliper 40 straddles an outer periphery of the brake disc 39. The front-wheel-use disc brake BF is arranged on a right side of the front wheel WF.

Figure 2:
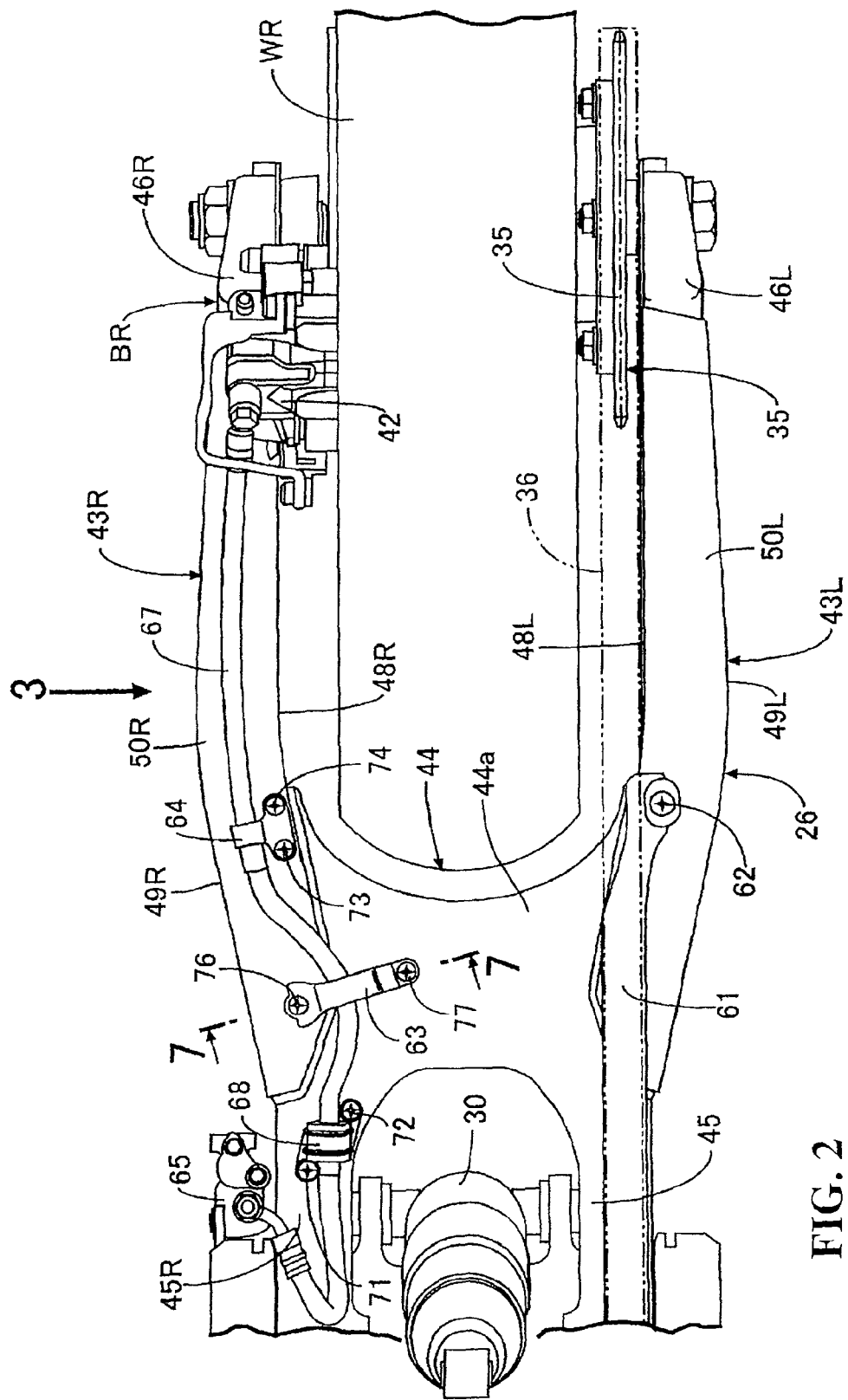
FIG. 2 a view of a portion as viewed in the direction indicated by an arrow 2 in FIG. 1.
Figure 3:
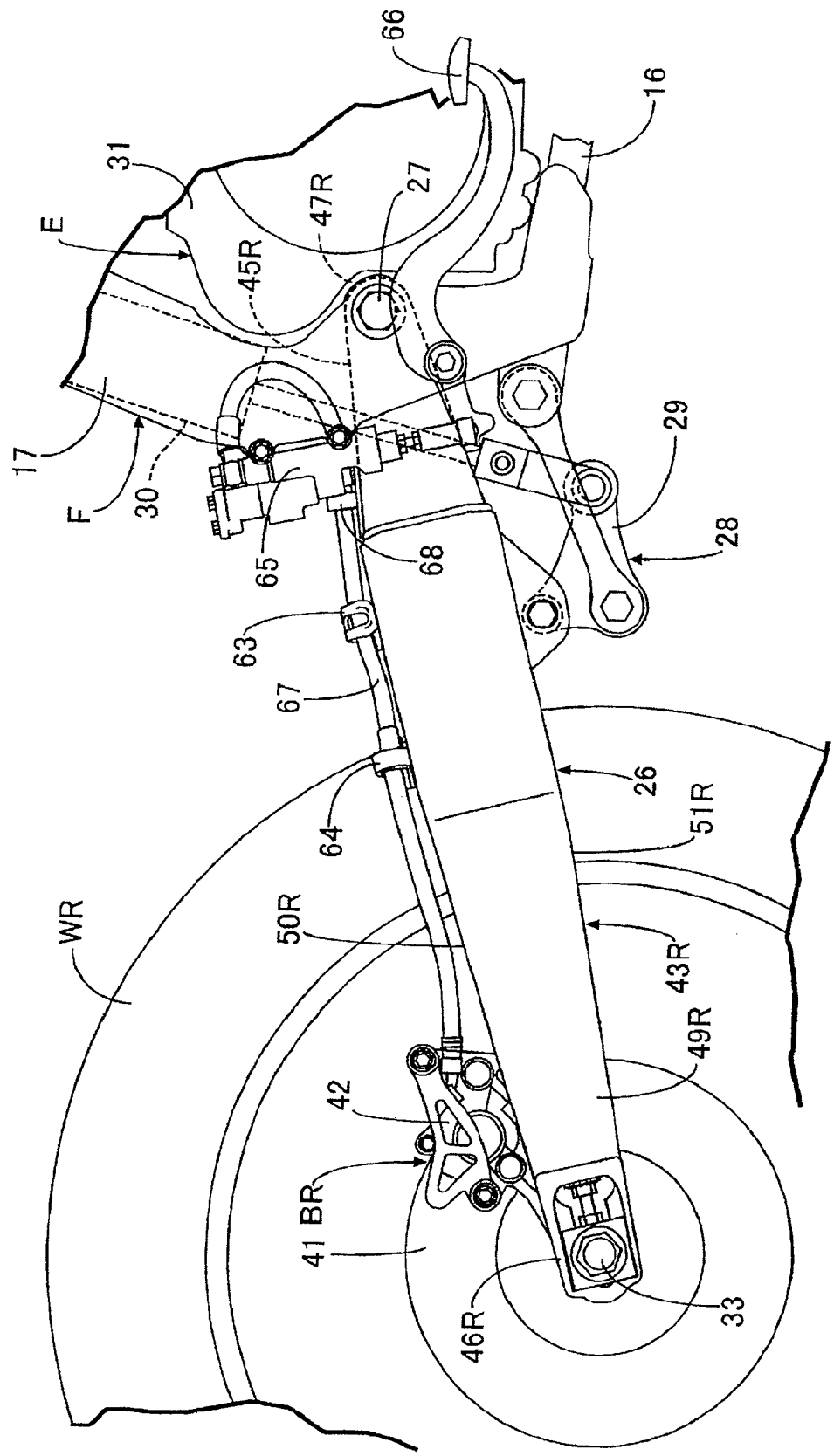
FIG. 3 a view of a portion as viewed in the direction indicated by an arrow 3 in FIG. 2.

To explain the embodiment also in conjunction with FIG. 2 and FIG. 3, the rotation of the rear wheel WR can be braked by a rear-wheel-use disc brake BR that includes a brake disc 41 that is rotated together with the rear wheel WR and a caliper 42 that is supported on the swing arm 26 in a state where the caliper 42 straddles an outer periphery of the brake disc 41. The rear-wheel-use disc brake BR is arranged on a right side of the rear wheel WR.

Figure 4:
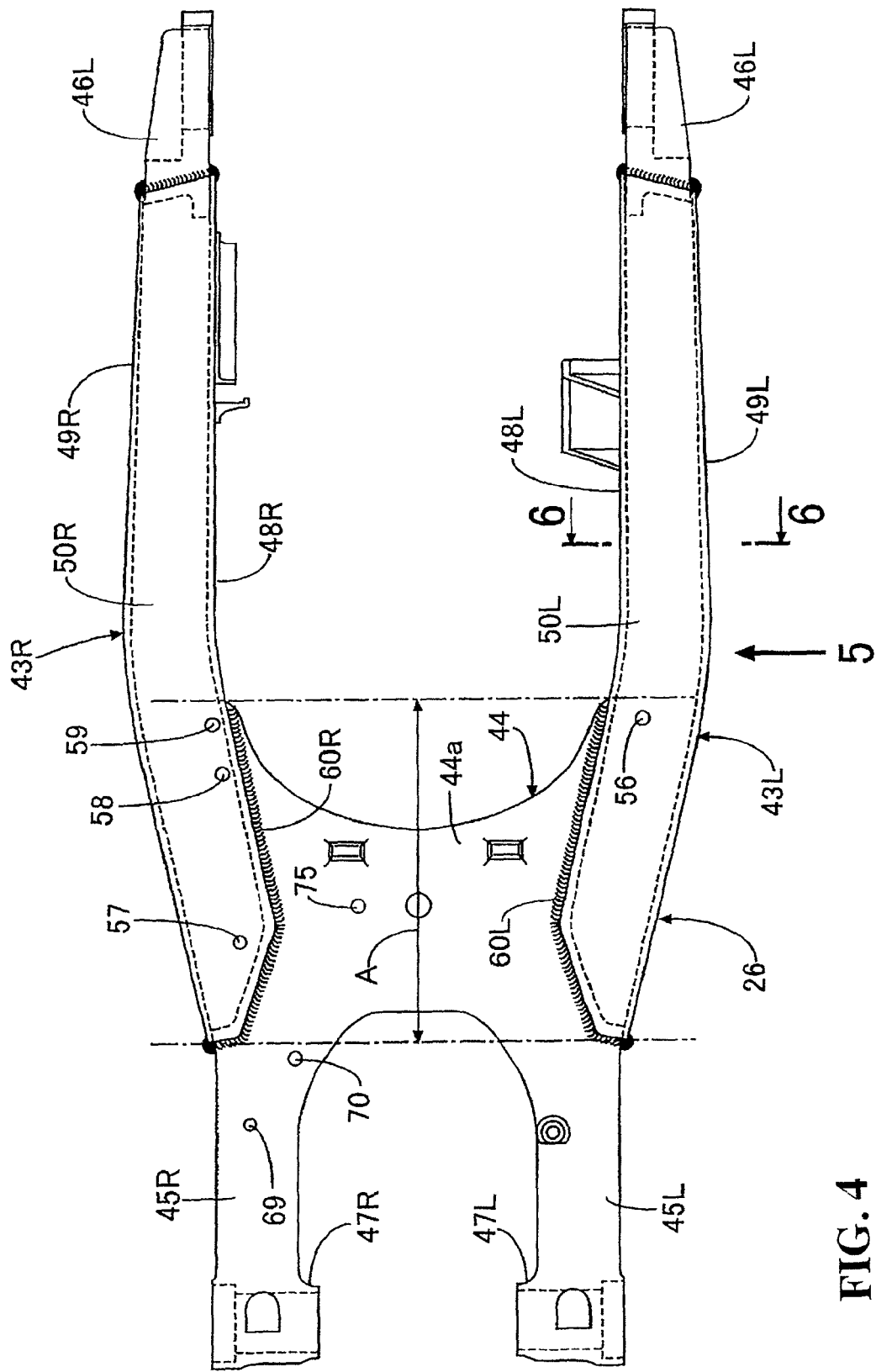
FIG. 4 a plan view of a swing arm.
Figure 5:
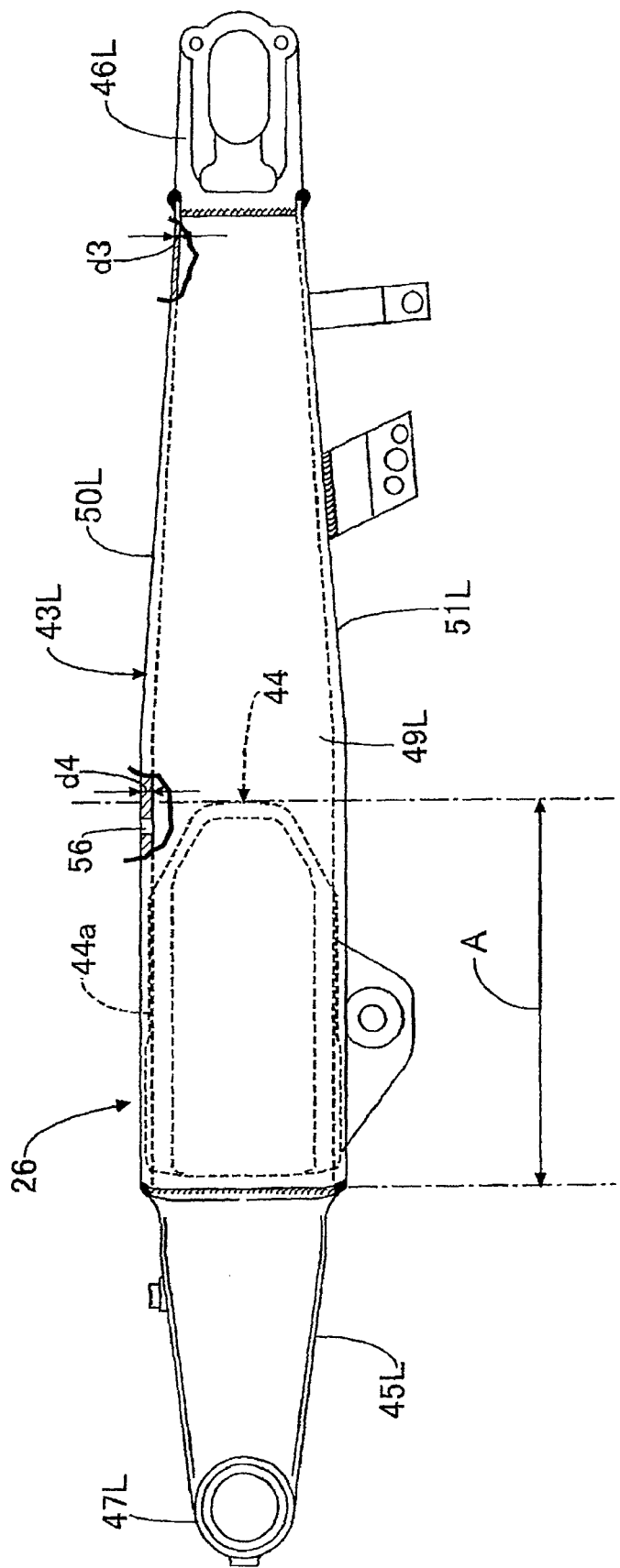
FIG. 5 a view of a portion as viewed in the direction indicated by an arrow 5 in FIG. 4.

To explain the embodiment further in conjunction with FIG. 4 and FIG. 5, the swing arm 26 includes a pair of left and right arms 43L, 43R extending in the longitudinal direction with a cross member 44 connecting front portions of these arms 43L, 43R to each other. A pair of left and right bearing arms 45L, 45R extends frontwardly integrally and contiguously with both left and right end portions of the cross member 44 thus forming an approximately U shape that opens frontwardly together with the cross member 44. End pieces 46L, 46R are joined by welding to rear end portions of the arms 43L, 43R, respectively, as pivotally supporting portions for pivotally supporting the axle 33 of the rear wheel WR. Both left and right side portions of the cross member 44 are welded to inner sides of the front portions of both arms 43L, 43R. Pivot portions 47L, 47R pivotally supported on the pivot plates 17 of the vehicle body frame F by way of the support shaft 27 in a swingable manner are formed on distal end portions of both bearing arms 45L, 45R. The pivot portions 47L, 47R are formed into a cylindrical shape so as to allow the support shaft 27 (see FIG. 1 and FIG. 3) to pass therethrough.

Figure 6:
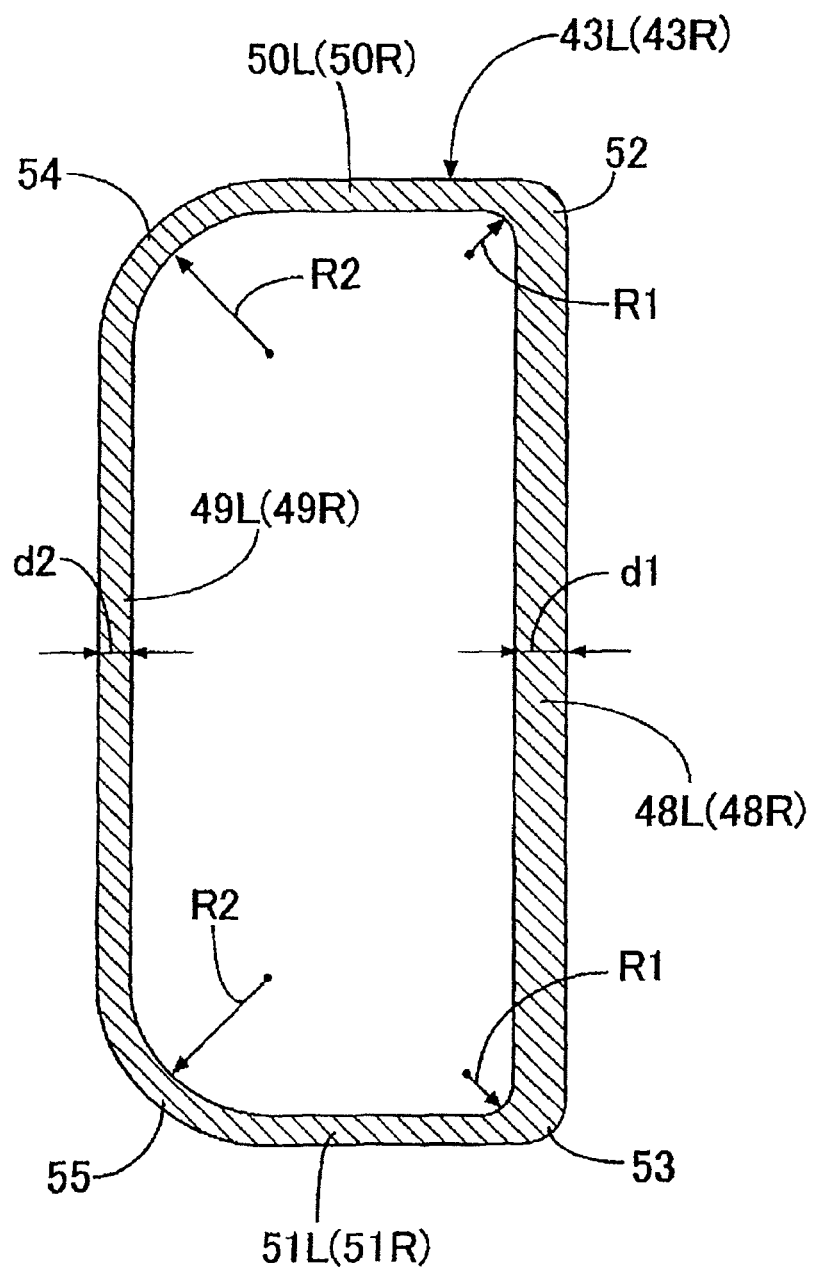
FIG. 6 a cross-sectional view taken along a line 6-6 in FIG. 4.

As shown in FIG. 6, the arms 43L, 43R respectively have an inner wall 48L, 48R and an outer wall 49L, 49R that are arranged parallel to each other in the vertical direction with an upper wall 50L, 50R that connects an upper edge of the inner wall 48L, 48R and an upper edge of outer wall 49L, 49R to each other. A lower wall 51L, 51R connects a lower edge of the inner wall 48L, 48R and a lower edge of the outer wall 49L, 49R to each other so that the arms 43L, 43R are formed into a rectangular cylindrical shape.

Further, the inner wall 48L, 48R is connected to the upper wall 50L, 50R and the lower wall 51L, 51R by way of a first curved portion 52, 53 that is bent with a first radius of curvature R1. The outer wall 49L, 49R is connected to the upper wall 50L, 50R and the lower wall 51L, 51R by way of a second curved portion 54, 55 that is bent with a second radius of curvature R2 that is three times larger than the first radius of curvature R1. A wall thickness d2 of the outer wall 49L, 49R is set smaller than a wall thickness d1 of the inner wall 48L, 48R.

The inner sides of the front portions of both arms 43L, 43R and both left and right end portions of the cross member 44 are welded to each other at welded portions 60L, 60R. Portions of both arms 43L, 43R behind the welded portions 60L, 60R formed between both arms 43L, 43R and the cross member 44 are formed such that a vertical width and a wall thickness of both arms 43L, 43R are gradually decreased as the arms 43L, 43R extend in the rearward direction. A wall thicknesses d3 of rearmost portions of both arms 43L, 43R is 60 to 80% of a wall thickness d4 of portions of the arms 43L, 43R where the vertical width is maximum, more specifically, portions of the arms 43L, 43R are arranged within a range A that the welded portions 60L, 60R occupy in the longitudinal direction.

In the upper wall of at least one of both arms 43L, 43R, in this embodiment, in the upper walls 50L, 50R of both arms 43L, 43R, mounting holes 56; 57, 58, 59 that are positioned within a range A that the welded portions 60L, 60R formed between both arms 43L, 43R and the cross member 44 occupy in the longitudinal direction are formed so as to allow the mounting of a functional parts or a design component on the upper walls 50L, 50R. In the upper wall 50L of the left arm 43L, the mounting hole 56 for mounting a chain slider 61 is formed such that the mounting hole 56 is positioned within the range A, wherein the chain slider 61 is a functional part wrapped around both upper and lower surfaces of the front portion of the arm 43L in a contact manner so as to allow the sliding of the chain 36 on the upper wall 50L. A screw member 62 that is allowed to pass through an upper portion of a rear end of the chain slider 61 is threaded into the mounting hole 56. Further, in the upper wall 50R of the right arm 43R, the mounting hole 57 for mounting a brake hose guide 63 for constituting a functional part and the pair of mounting holes 58, 59 for mounting a brake hose clip 64 for constituting a functional part are formed such that the mounting holes 58, 59 are positioned behind the mounting hole 57 within the range A.

To explain the embodiment by focusing on FIG. 2 and FIG. 3, a master cylinder 65 is mounted on a lower portion of the right pivot plate 17, and a brake pedal 66 for inputting a brake operation force to the master cylinder 65 is also supported on the right pivot plate 17 in a rotationally operable manner. A brake hose 67 that has one end portion thereof connected to the master cylinder 65 is arranged along an upper surface of the right bearing arm 45R, an upper surface of the cross member 44 and an upper surface of the right arm 43R of the swing arm 26, and the other end portion of the brake hose 67 is connected to the caliper 42 of the rear-wheel-use disc brake BR.

A brake hose clip 68 for holding the brake hose 67 is mounted on an upper surface of the right bearing arm 45R with screw members 71, 72 that are allowed to pass through the brake hose clip 68 being threaded into a pair of mounting holes 69, 70 that is formed in the upper wall of the right bearing arm 45R. Further, screw members 73, 74 that are allowed to pass through the brake hose clip 64 are threaded into the mounting holes 58, 59 that are formed in the upper wall 50R of the right arm 43R.

Figure 7:
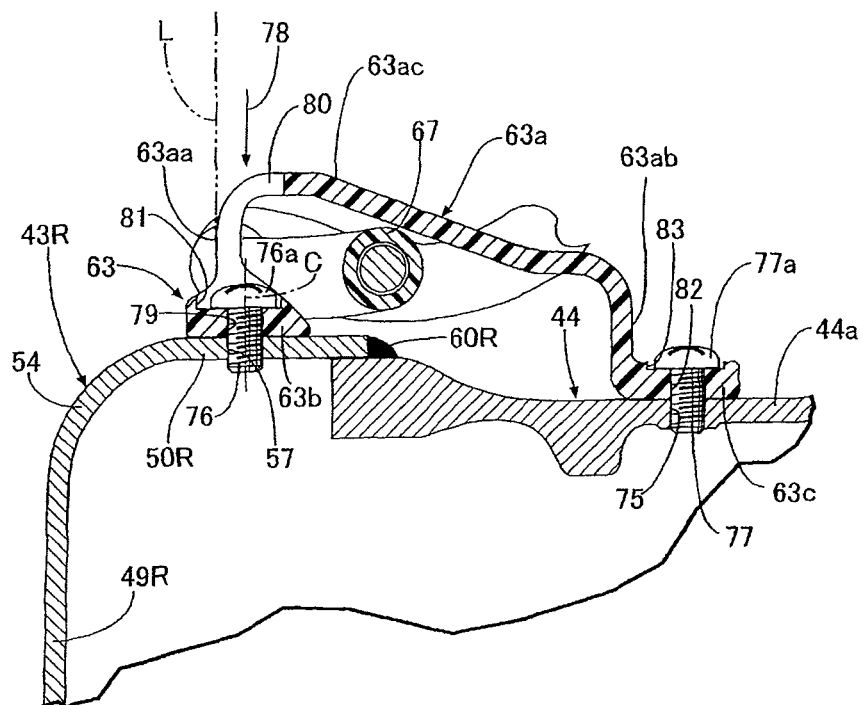
FIG. 7 an enlarged cross-sectional view taken along a line 7-7 in FIG. 2.

As shown in FIG. 7, the brake hose guide 63 is arranged such that the brake hose guide 63 straddles the brake hose 67 at a portion where the cross member 44 and the right arm 43R are connected to each other, and screw members 76, 77 that are allowed to pass through the brake hose guide 63 are threaded into the mounting hole 57 that is formed in the upper wall 50R of the right arm 43R and a mounting hole 75 that is formed in an upper wall 44a of the cross member 44.

Figure 8:
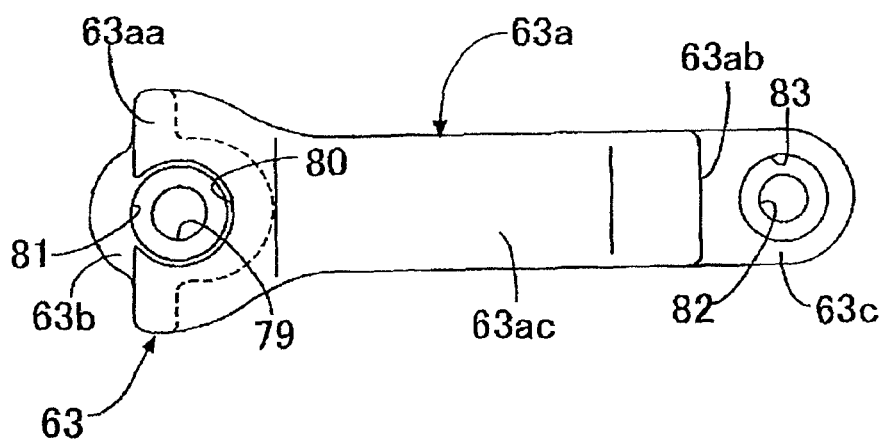
FIG. 8 a plan view of a brake hose guide.

To explain the embodiment also in conjunction with FIG. 8, the brake hose guide 63 includes a guide portion 63a constructed of a pair of first and second vertical wall portions 63aa, 63ab and a connecting portion 63ac for connecting the vertical wall portions 63aa, 63ab to each other. The brake hose guide 63 is made of a synthetic resin. The brake hose guide 63 is fastened to the right arm 43R of the swing arm 26 and the cross member 44 in a state where the brake hose guide 63 allows the brake hose 67 to pass through the inside of the guide portion 63a.

The brake hose guide 63 further includes, as integral parts thereof, a first mounting portion 63b connected to the first vertical wall portion 63aa that is a specified vertical wall portion and constitutes at least one of the first and second vertical wall portions 63aa, 63ab and is formed such that a portion of the first mounting portion 63b projects more toward the inside of the guide portion 63a than the first vertical wall portion 63aa. A second mounting portion 63c is arranged at a position spaced apart from the first mounting portion 63b mounted on the upper wall 50R of the right arm 43R on one side in the vehicle width direction to the other side in the vehicle widthwise direction, and is connected to the second vertical wall portion 63ab of the guide portion 63a such that the second mounting portion 63c is mounted on the upper wall 44a of the cross member 44. The first mounting portion 63b is connected to the first vertical wall portion 63aa at a right angle, and the second mounting portion 63c is connected to the second vertical wall portion 63ab at a right angle.

A first fastening hole 79 for allowing the screw member 76 threaded into the mounting hole 57 to pass therethrough is formed in the first mounting portion 63b. At least a portion of the first fastening hole 79 is arranged inside an outer end portion of the first vertical wall portion 63aa as viewed in a fastening direction 78 wherein the brake hose guide 63 is fastened to the swing arm 26. More specifically, the first fastening hole 79 is arranged inside an imaginary straight line L that passes the outer end portion of the first vertical wall portion 63aa and extends parallel to the fastening direction 78. More particularly, it is desirable that the center axis C of the first fastening hole 79 is arranged inside the outer end portion of the first vertical wall portion 63aa as viewed in the fastening direction 78.

An opening portion 80 allowing the screw member 76 to pass therethrough is formed on the guide portion 63a on an extension of the center axis C of the first fastening hole 79. In this embodiment, the opening portion 80 is formed by cutting away a portion of the guide portion 63a such that the opening portion 80 is opened inwardly, outwardly and upwardly with respect to the guide portion 63a. However, the opening portion 80 may be a hole formed coaxially with the first fastening hole 79.

Further, a counterboring portion 81 is coaxially connected with the first fastening hole 79 for preventing an enlarged diameter head portion 76a of the screw member 76, that is allowed to pass through the first fastening hole 79, from projecting toward the inside of the guide portion 63a. The counterboring portion 81 is formed on the first mounting portion 63b in such a manner that the enlarged diameter head portion 76a can be accommodated in the counterboring portion 81.

A second fastening hole 82 for allowing the screw member 77 threaded into the mounting hole 75 to pass therethrough and a counterboring portion 83 that accommodates a portion of an enlarged diameter head portion 77a of the screw member 77 are formed in the second mounting portion 63c.

Next, the manner of operation of this embodiment is explained. The swing arm 26 includes the pair of left and right angular cylindrical arms 43L, 43R that extend in the longitudinal direction. The cross member 44 is welded to the inner sides of the front portions of the arms 43L, 43R. The pair of left and right bearing arms 45L, 45R are integrally connected to both left and right end portions of the cross member 44 and extend frontward thus forming an approximately U shape opened frontwardly together with the cross member 44. The mounting holes 56, 57, 58, 59 are positioned within a range A occupied in a longitudinal direction by the welded portions 60L, 60R formed between both arms 43L, 43R and the cross member 44 are formed in the upper wall 50L, 50R of at least one of both arms 43L, 43R for mounting a functional part or a design part. Both arms 43L, 43R are formed such that a vertical width and a wall thickness of both arms 43L, 43R are gradually decreased rearwardly behind the welded portions 60L, 60R formed between both arms 43L, 43R and the cross member 44. Accordingly, the mounting holes 56 to 59 are formed in portions of the upper walls 50L, 50R of the arms 43L, 43R where the vertical width and the wall thickness are not decreased. Thus, the large lowering of rigidity of the swing arm 26 as a whole cannot be induced. Further, the vertical width and the wall thickness of both arms 43L, 43R are gradually decreased behind the welded portions 60L, 60R formed between both arms 43L, 43R and the cross member 44. Thus, proper torsional rigidity can be imparted to the swing arm 26 whereby the lowering of rigidity of the arms 43L, 43R can be suppressed by not forming working holes in the arms 43L, 43R behind the welded portions 60L, 60R formed between both arms 43L, 43R and the cross member 44.

Further, the mounting holes 56 to 59 are formed in the upper walls 50L, 50R of the pair of left and right arms 43L, 43R respectively. The chain slider 61 is mounted in the mounting hole 56 formed in the left arm 43L. The brake hose guide 63 and the brake hose clip 64 that constitute other functional parts are mounted in the mounting holes 57, 58, 59 formed in the right arm 43R. Accordingly, the lateral balance can be enhanced by avoiding a state where the mounting holes are formed on only one arm side.

The pair of left and right arms 43L, 43R is formed into a rectangular cylindrical shape having a rectangular transverse cross section and is respectively constructed of the inner wall 48L, 48R. The outer wall 49L, 49R are arranged parallel to each other in the vertical direction with the upper wall 50L, 50R for connecting the upper end of the inner wall 48L, 48R and the upper end of the outer wall 49L, 49R to each other. The lower wall 51L, 51R connect the lower end of the inner wall 48L, 48R and the lower end of the outer wall 49L, 49R to each other. These arms 43L, 43R are formed such that the wall thickness d2 of the outer wall 49L, 49R is set smaller than the wall thickness d1 of the inner wall 48L, 48R. Thus, it is possible to impart proper deflection to the swing arm 26.

Further, the inner wall 48L, 48R is connected to the upper wall 50L, 50R and the lower wall 51L, 51R by way of the first bent portions 52, 53 bent with the first radius of curvature R1. The outer wall 49L, 49R is connected to the upper wall 50L, 50R and the lower wall 51L, 51R by way of the second bent portion 54, 55 bent with the second radius of curvature R2 that is three times or more larger than the first radius of curvature R1. The wall thickness d3 of the rearmost portion of the arm 43L, 43R is set to 60 to 80% of the wall thickness d4 of the portion of the arm 43L, 43R having a largest vertical width. Accordingly, it is possible to impart flexibility to twisting of the swing arm 26.

Further, while the brake hose guide 63 having the guide portion 63a that allows the brake hose 67 to pass through the inside thereof is fastened to the swing arm 26, the guide portion 63a is constituted of the first and second vertical wall portions 63aa, 63ab and the connecting portion 63ac that connects these vertical wall portions 63aa, 63ab. The first mounting portion 63b, that has a portion thereof projecting more toward the inside the guide portion 63a than the first vertical wall portion 63aa, is integrally connected to the first vertical wall portion 63aa out of the first and second vertical wall portions 63aa, 63ab. At least a portion of the first fastening hole 79 formed in the first mounting portion 63b so as to allow the screw member 76 to pass therethrough is arranged inside the outer end portion of the first vertical wall portion 36aa as viewed in the fastening direction 78. Accordingly, even when a mounting space for mounting the brake hose guide 63 on the swing arm 26 is small, the brake hose guide 63 can be mounted on the swing arm 26.

Further, the opening portion 80 is formed on the guide portion 63a on the extension of the center axis C of the second fastening hole 79 so as to allow the screw member 76 to pass therethrough. Accordingly, a fastening operation of the screw member 76 can be performed from a guide portion 63a side in a state where the first mounting portion 63b is brought into contact with the right-side arm 43R of the swing arm 26. Thus, a mounting operation for mounting the brake hose guide 63 can be performed easily.

Further, the center axis C of the first fastening hole 79 is arranged inside the outer end portion of the first vertical wall portion 63aa as viewed in the fastening direction 78. Thus, even when a mounting space for mounting the brake hose guide 63 on the swing arm 26 is small, the brake hose guide 63 can be mounted on the swing arm 26.

The counterboring portion 81 is coaxially connected with the first fastening hole 79 for preventing the enlarged diameter head portion 76a of the screw member 76 that is allowed to pass through the first fastening hole 79 from projecting toward the inside of the guide portion 63a. The counterboring portion 81 is formed on the first mounting portion 63b in such a manner that the counterboring portion 81 that is coaxially and contiguously formed with the first fastening hole 79 can accommodate the enlarged diameter head portion 76a therein. Accordingly, the enlarged diameter head portion 76a does not project into the inside of the guide portion 63a. Thus, it is possible to make the enlarged diameter head portion 76a minimally injure the brake hose 67 that is allowed to pass through the guide portion 63a.

Further, the brake hose guide 63 includes, in addition to the first mounting portion 63b that is arranged on one side in the vehicle widthwise direction, the second mounting portion 63c that is arranged on the other side in the vehicle widthwise direction and in that the second fastening hole 82 is formed as an integral part thereof. Accordingly, a supporting width for supporting the brake hose 67 can be increased while decreasing a space necessary for mounting the brake hose guide 63 on a swing arm 26 side.

In the above-mentioned embodiment, an explanation has been made with respect to the brake hose guide 63 where the brake hose 67 is arranged along the swing arm 26 of the motorcycle to be allowed to pass through the guide 63a. However, the present invention is not limited to a motorcycle, and is widely applicable in association with a brake hose mounted on a vehicle.

Further, in the above-mentioned embodiment, an explanation is made with respect to the case where the specified vertical wall portion is formed of the first vertical wall portion 63aa that is one of the first and second vertical wall portions 63aa, 63ab constituting a portion of the guide portion 63a of the brake hose guide 63. However, both the first and second vertical wall portions 63aa, 63ab are set as specified vertical wall portions. The first and second mounting portions 63aa, 63ab may be formed such that portions of these first and second mounting portions 63aa, 63ab project to the inside of the guide portion from the first and second vertical wall portions.

Further, in the above-mentioned embodiment, the first and second vertical wall portions 63aa, 63ab and the first and second mounting portions 63b, 63c are connected to each other at a right angle. However, the first and second vertical wall portions may be inclined or bent inwardly or outwardly from the first and second mounting portions.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A brake hose guide including a guide portion having a pair of vertical wall portions and a connecting portion for connecting the vertical wall portions to each other, the brake hose guide being fastened to a support body in such a manner that a brake hose is allowed to pass through an inside of the guide portion, the brake hose guide further comprising:
a mounting portion connected to a specified vertical wall portion constituting at least one of the pair of vertical wall portions and being formed such that a portion of the mounting portion projects more toward an inside of the guide portion than the specified vertical wall portion, and at least a portion of a fastening hole, formed in the mounting portion for allowing a fastening member to pass therethrough, is arranged inside an outer end portion of the specified vertical wall portion as viewed in a fastening direction of the fastening member toward the support body.

2. The brake hose guide according to claim 1, and further including a motorcycle wherein the support body is a swing arm pivotally supporting a rear wheel of the motorcycle, the swing arm comprises:
a pair of left and right angular arms with a rectangular transverse cross-sectional shape defined by an inner wall, an outer wall, an upper wall for connecting upper ends of the inner wall and the outer wall, and a lower wall for connecting lower ends of the inner wall and the outer wall and extending in a longitudinal direction of the motorcycle;
a cross member welded to inner sides of front portions of the pair of left and right angular arms; and
a pair of left and right bearing arms integrally connected to both left and right end portions of the cross member and extending frontward thus forming an approximately U shape opened frontwardly together with the cross member;
pivotally supporting portions pivotally supporting an axle of the rear wheel are formed on rear end portions of the pair of left and right angular arms, and
mounting holes positioned within a range occupied along a longitudinal direction of a welded portion formed between the left angular arm and the cross member and the right angular arm and the cross member, said mounting holes being formed in the upper wall of at least one of said pair of left and right angular arms for mounting a functional part or a design part, and said pair of left and right angular arms are formed such that a wall thickness of said pair of left and right angular arms gradually decreases rearwardly behind the welded portions between said both pair of left and right angular arms and the cross member.

3. The brake hose guide according to claim 2, wherein the pair of left and right angular arms are formed such that a vertical width of the pair of left and right angular arms gradually decreases rearwardly behind the welded portions.

4. The brake hose guide according to claim 3, wherein the mounting holes are formed in the upper walls of the pair of left and right angular arms respectively, a chain slider constituting a functional part is mounted in the mounting hole formed in one of the left or right angular arm and the brake hose guide and a brake hose clip that constitute other functional parts are mounted in the mounting holes formed in the other of the right or the left angular arm.

5. The brake hose guide according to claim 3, wherein the left and right angular arms are formed such that a wall thickness of the outer walls is smaller than a wall thickness of the inner walls.

6. The brake hose guide according to claim 3, wherein the inner wall is connected to the upper wall and the lower wall by way of a first bent portion that is bent with a first radius of curvature, the outer wall is connected to the upper wall and the lower wall by way of a second bent portion that is bent with a second radius of curvature three times or more larger than the first radius of curvature, and a wall thickness of a rearmost portion of the left and right angular arm is set to 60 to 80% of a wall thickness of a portion of the left and right angular arm that has a largest vertical width.

7. The brake hose guide according to claim 2, wherein the mounting holes are formed in the upper walls of the pair of left and right angular arms respectively, a chain slider constituting a functional part is mounted in the mounting hole formed in one of the left or right angular arm and the brake hose guide and a brake hose clip that constitute other functional parts are mounted in the mounting holes formed in the other of the right or the left angular arm.

8. The brake hose guide according to claim 2, wherein the left and right angular arms are formed such that a wall thickness of the outer walls is smaller than a wall thickness of the inner walls.

9. The brake hose guide according to claim 2, wherein the inner wall is connected to the upper wall and the lower wall by way of a first bent portion that is bent with a first radius of curvature, the outer wall is connected to the upper wall and the lower wall by way of a second bent portion that is bent with a second radius of curvature three times or more larger than the first radius of curvature, and a wall thickness of a rearmost portion of the left and right angular arm is set to 60 to 80% of a wall thickness of a portion of the left and right angular arm that has a largest vertical width.

10. The brake hose guide according to claim 1, wherein an opening portion for allowing the fastening member to pass therethrough is formed on the guide portion on an extension of a center axis of the fastening hole.

11. The brake hose guide according to claim 10, wherein the center axis of the fastening hole is arranged inside an outer end portion of the specified vertical wall portion as viewed from the fastening direction.

12. The brake hose guide according to claim 10, wherein a counterboring portion is coaxially and contiguously formed with the fastening hole for preventing an enlarged diameter head portion of the fastening member that is allowed to pass through the fastening hole from projecting toward the inside of the guide portion, said counterboring portion being formed in the mounting portion wherein the counterboring portion accommodates the enlarged diameter head portion therein.

13. The brake hose guide according to claim 10, wherein the support body is a swing arm pivotally supporting a rear wheel of a motorcycle, and the brake hose guide includes, in addition to the mounting portion which is arranged on a first side of the brake hose guide in a vehicle widthwise direction, a second mounting portion arranged on a second side of the brake hose guide in the vehicle widthwise direction wherein a second fastening hole is formed as an integral part of the second mounting portion.

14. The brake hose guide according to claim 1, wherein a center axis of the fastening hole is arranged inside an outer end portion of the specified vertical wall portion as viewed from the fastening direction.

15. The brake hose guide according to claim 14, wherein a counterboring portion is coaxially and contiguously formed with the fastening hole for preventing an enlarged diameter head portion of the fastening member that is allowed to pass through the fastening hole from projecting toward the inside of the guide portion, said counterboring portion being formed in the mounting portion wherein the counterboring portion accommodates the enlarged diameter head portion therein.

16. The brake hose guide according to claim 14, wherein the support body is a swing arm pivotally supporting a rear wheel of a motorcycle, and the brake hose guide includes, in addition to the mounting portion which is arranged on a first side of the brake hose guide in a vehicle widthwise direction, a second mounting portion arranged on a second side of the brake hose guide in the vehicle widthwise direction wherein a second fastening hole is formed as an integral part of the second mounting portion.

17. The brake hose guide according to claim 1, wherein a counterboring portion is coaxially and contiguously formed with the fastening hole for preventing an enlarged diameter head portion of the fastening member that is allowed to pass through the fastening hole from projecting toward the inside of the guide portion, said counterboring portion being formed in the mounting portion wherein the counterboring portion accommodates the enlarged diameter head portion therein.

18. The brake hose guide according to claim 1, wherein the support body is a swing arm pivotally supporting a rear wheel of a motorcycle, and the brake hose guide includes, in addition to the mounting portion which is arranged on a first side of the brake hose guide in a vehicle widthwise direction, a second mounting portion arranged on a second side of the brake hose guide in the vehicle widthwise direction wherein a second fastening hole is formed as an integral part of the second mounting portion.

19. A brake hose guide comprising:

a guide portion having a pair of vertical wall portions a connecting portion for connecting the vertical wall portions to each other;

a mounting portion connected to a specified vertical wall portion constituting at least one of the pair of vertical wall portions, said mounting portion being formed such that a portion of the mounting portion projects more toward an inside of the guide portion than the specified vertical wall portion; and at least a portion of a fastening hole is formed in the mounting portion for allowing a fastening member to pass therethrough, said at least the portion of the fastening hole being arranged inside an outer end portion of the specified vertical wall portion as viewed in a fastening direction of the fastening member toward a support body.

20. The brake hose guide according to claim 19, wherein an opening portion for allowing the fastening member to pass therethrough is formed on the guide portion on an extension of a center axis of the fastening hole.

* * * * *